Patented May 9, 1939

2,157,712

UNITED STATES PATENT OFFICE 2,157,712

PROCESS OF PRODUCING RED CHROMIUM PIGMENTS

Ekbert Lederle, Ludwigshafen-on-the-Rhine, Germany, assignor to General Dyestuff Corporation, New York, N. Y., a corporation of New York No Drawing. Application July 22, 1936, Serial No. 91,913. In Germany July 27, 1935

7 Claims. (Cl. 134—58)

The present invention relates to a new process of producing red chromium pigments. Yellow to red chromate pigments are known which consist of mixed crystals of lead chromate, lead sulphate and lead molybdate, if desired also lead tungstate. The precipitation of the components from a common solution is a preferred method of preparing the mixed crystals and in the production of red pigments with at least 4 per cent of lead molybdate the use of strongly acid precipitants by which the formation of the desired red pigments is accelerated is recommended.

When starting wholly from lead acetate or from solutions containing at least about 7 per cent of the necessary lead in form of lead acetate in the preparation of these red pigments, it is found when working up the precipitated product that it is very difficult completely to wash out unused lead salts; the consequence of this is that the fastness to light is unfavorably influenced.

I have now found that in the said cases pigments which may be readily washed and which have a very good stability to light can also be obtained which are moreover distinguished by especially great color strength and covering power by carrying out the precipitation of the mixed crystals with an excess of $SO_4$-ions which preferably amounts to more than 10 per cent over the amount stoichiometrically corresponding to the composition of the desired product.

The following examples will further illustrate the nature of this invention but the invention is not restricted to these examples. The parts are by weight.

Example 1

A solution of 310 parts of litharge in 630 parts of 30 per cent acetic acid and 7000 parts of water is mixed with a solution of 162 parts of sodium chromate, 100 parts of anhydrous sodium sulphate (i. e. 298 per cent of the theoretical amount) and 27 parts of ammonium molybdate in 7000 parts of water. The whole is stirred until the desired red pigment has developed after which it is filtered off and dried at 120° C.

What I claim is:

1. The process of producing red pigments by precipitating mixed crystals comprising normal lead chromate, normal lead sulphate and normal lead molybdate which comprises mixing an aqueous solution containing the necessary lead in the form of at least one soluble lead salt, at least 7 per cent of the lead being present as lead acetate, with an aqueous solution containing besides chromate and enough molybdate ions to produce mixed crystals containing at least 4 per cent of lead molybdate, sulphate ions in an excess of at least 10 per cent over the amount stoichiometrically corresponding to the composition of the desired product.

2. The process of producing red pigments by precipitating mixed crystals comprising normal lead chromate, normal lead sulphate and normal lead molybdate which comprises mixing an aqueous solution containing the necessary lead in the form of lead acetate with an aqueous solution containing besides chromate and enough molybdate ions to produce mixed crystals containing at least 4 per cent of lead molybdate, sulphate ions in an excess of at least 10 per cent over the amount stoichiometrically corresponding to the composition of the desired product.

3. The process of producing red pigments by precipitating mixed crystals comprising normal lead chromate, normal lead sulphate and normal lead molybdate which comprises mixing an aqueous solution containing the necessary lead in the form of at least one soluble lead salt, at least 7 per cent of the lead being present as lead acetate, with an aqueous solution containing besides chromate and enough molybdate ions to produce mixed crystals containing at least 4 per cent of lead molybdate, sulphate ions in an excess of at least 100 per cent over the amount stoichiometrically corresponding to the composition of the desired product.

4. The process of producing red pigments by precipitating mixed crystals comprising normal lead chromate, normal lead sulphate, normal lead molybdate and normal lead tungstate which comprises mixing an aqueous solution containing the necessary lead in the form of at least one soluble lead salt, at least 7 per cent of the lead being present as lead acetate, with an aqueous solution containing besides chromate, tungstate and enough molybdate ions to produce mixed crystals containing at least 4 per cent of lead molybdate, sulphate ions in an excess of at least 10 per cent over the amount stoichiometrically corresponding to the composition of the desired product.

5. The process of producing red pigments by precipitating mixed crystals comprising normal lead chromate, normal lead sulphate and normal lead molybdate which comprises mixing an aqueous solution containing the necessary lead in the form of lead acetate with an aqueous solution containing besides chromate and enough molybdate ions to produce mixed crystals containing at least 4 per cent of lead molybdate, sulphate ions in an excess of at least 100 per cent over the amount stoichiometrically corresponding to the composition of the desired product.

6. The process of producing red pigments by precipitating mixed crystals comprising normal lead chromate, normal lead sulphate, normal lead molybdate and normal lead tungstate which comprises mixing an aqueous solution containing the necessary lead in the form of lead acetate with an aqueous solution containing besides chromate, tungstate and enough molybdate ions to produce mixed crystals containing at least 4 per cent of lead molybdate, sulphate ions in an excess of at least 10 per cent over the amount stoichiometrically corresponding to the composition of the desired product.

7. The process of producing red pigments by precipitating mixed crystals comprising normal lead chromate, normal lead sulphate, normal lead molybdate and normal lead tungstate which comprises mixing an aqueous solution containing the necessary lead in the form of at least one soluble lead salt, at least 7 per cent of the lead being present as lead acetate, with an aqueous solution containing besides chromate, tungstate and enough molybdate ions to produce mixed crystals containing at least 4 per cent of lead molybdate, sulphate ions in an excess of at least 100 per cent over the amount stoichiometrically corresponding to the composition of the desired product.

EKBERT LEDERLE.